United States Patent
Kusumi et al.

(10) Patent No.: US 7,124,733 B2
(45) Date of Patent: Oct. 24, 2006

(54) MOUNTING STRUCTURE OF MOTOR GENERATOR FOR INTERNAL COMBUSTION ENGINE

(75) Inventors: Hidetoshi Kusumi, Brussels (BE); Noriyuki Habara, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/084,254

(22) Filed: Mar. 21, 2005

(65) Prior Publication Data

US 2005/0224040 A1    Oct. 13, 2005

(30) Foreign Application Priority Data

Apr. 12, 2004    (JP)    ............................. 2004-116618

(51) Int. Cl.
  *F02B 61/04*    (2006.01)
  *F02B 75/06*    (2006.01)

(52) U.S. Cl. .................................. 123/198 R; 474/134
(58) Field of Classification Search ............ 123/198 R, 123/192.1; 474/134, 135
See application file for complete search history.

(56) References Cited

U.S. PATENT DOCUMENTS

| | | | |
|---|---|---|---|
| 4,758,208 A * | 7/1988 | Bartos et al. | ................ 474/135 |
| 6,609,989 B1 * | 8/2003 | Bogner et al. | ............... 474/134 |
| 6,830,524 B1 * | 12/2004 | Tamai | ......................... 474/134 |

FOREIGN PATENT DOCUMENTS

| | | |
|---|---|---|
| JP | 2003-074364 | 3/2003 |
| JP | 2003-201857 | 7/2003 |

* cited by examiner

*Primary Examiner*—Noah P. Kamen
(74) *Attorney, Agent, or Firm*—Kenyon & Kenyon LLP

(57) ABSTRACT

A tensioner that controls tension of a loop-shaped connecting body linking an output portion of an engine body and an output-input portion of a motor generator is fixed to the motor generator.

3 Claims, 3 Drawing Sheets

PRIOR ART

MOUNTING STRUCTURE OF MOTOR GENERATOR FOR INTERNAL COMBUSTION ENGINE

INCORPORATION BY REFERENCE

The disclosure of Japanese Patent Application No. 2004-116618 filed on Apr. 12, 2004 including the specification, drawings and abstract is incorporated herein by reference in its entirety.

BACKGROUND OF THE INVENTION

1. Field of the Invention

The invention relates to a mounting structure of a motor generator for an internal combustion engine in which the motor generator is attached to an engine body of the internal combustion engine and coupled to and driven by the output thereof. More particularly, the invention relates to such a mounting structure for which a tensioner, which applies tension to a power transmission belt coupled to the internal combustion engine, is attached to the motor generator.

2. Description of the Related Art

Art is known in which the output of an engine is utilized to drive a water pump, an air conditioner compressor, an alternator, and the like. Moreover, a motor generator is sometimes adopted in place of an alternator, and used to provide torque assistance. In this case, the motor generator is driven by the output of the engine instead of the alternator.

FIG. 3 shows a known motor generator mounting structure e of this type. A pulley 12 is provided on an engine block 10 and rotated by a crank shaft of the engine.

In addition, a water pump 14 is provided on one side of the engine block 10 (more specifically, the right side as shown in FIG. 3). The water pump 14 is a coolant pump that uses rotation of a pulley 16 to circulate coolant to the engine and a radiator (not shown).

A motor generator 18 is disposed next to the water pump 14. The motor generator 18 uses torque of the engine to generate electricity for recharging a battery (not shown), and, in addition, assists engine output torque when necessary by rotating an output shaft of the engine (namely, the crank shaft). The motor generator 18 has a rotating shaft to which a pulley 20 is attached. Moreover, an air conditioner compressor 22 is disposed near to the water pump 14 and the motor generator 18. The compressor 22 is driven by a pulley 24.

A belt 26 is wound around the pulleys 12, 16, 20 and 24. Accordingly, driving force of the pulley 12 is used to drive the water pump 14, the motor generator 18, and the compressor 22.

Note that, in order to transmit driving force it is essential that the belt 26 is pressed against the pulleys 12, 16, 20 and 24 so that it does not slip. To achieve this, a tensioner 28 is provided that applies tensioning force (tension) to the belt 26.

The tensioner 28 includes a body 34, and a pair of rollers 36a and 36b. The pair of rollers 36a and 36b apply tension to the belt 26 by pressing the outer sides thereof. The tensioner 28 is fixed at one side to a boss of the engine block 10 using a bracket 38a, and at the other side to an external wall of the water pump 14 using a bracket 38b.

In the previously described structure, provision of the tensioner 28 enables a desired amount of tension to be applied to the belt 26. Accordingly, driving force can be reliably transmitted using the belt 26.

Note that, the tensioner 28 is highly versatile, and may be used with various different types of engines. However, in the case of another engine, the position of the boss to which the tensioner can be fixed is different, and thus it is necessary to manufacture a bracket to match. Moreover, if a suitable boss is not provided on the engine block, it is necessary to make changes to the engine block itself.

It should be noted that there are various ways in which tensioners can be fitted to an engine. For example, Japanese Patent Laid-Open Publication No. 2003-201857 discloses a configuration in which a tensioner is attached to an oil pump that is driven by an engine via a chain. The tensioner applies tension to the chain.

SUMMARY OF THE INVENTION

The invention provides a motor generator mounting structure for an internal combustion engine that enables a tensioner to be efficiently attached.

A first aspect of the invention relates to a motor generator mounting structure for an internal combustion engine including an engine body including a drive shaft and an output portion connected to the drive shaft, a motor generator which is attached to the engine body and which includes a drive shaft and an output-input portion connected to the drive shaft, a loop-shaped connecting body that links the output portion of the engine body and the output-input portion of the motor generator, and a tensioner which controls tension of the loop-shaped connecting body and which is fixed to the motor generator.

According to the foregoing structure, since the tensioner is attached to the motor generator, there is no need to attach the tensioner to the engine body, which offers enhanced versatility. Also, this structure provides an advantage that if the loop-shaped connecting body is a belt or the like, its winding angle can be easily maintained at a predetermined angle or more.

BRIEF DESCRIPTION OF THE DRAWINGS

The foregoing and/or further objects, features and advantages of the invention will become more apparent from the following description of preferred embodiment with reference to the accompanying drawings, in which like numerals are used to represent like elements and wherein.

DETAILED DESCRIPTION OF THE PREFERRED EMBODIMENTS

Hereinafter, an embodiment of the invention will be described with reference to the drawings.

Figure 1:
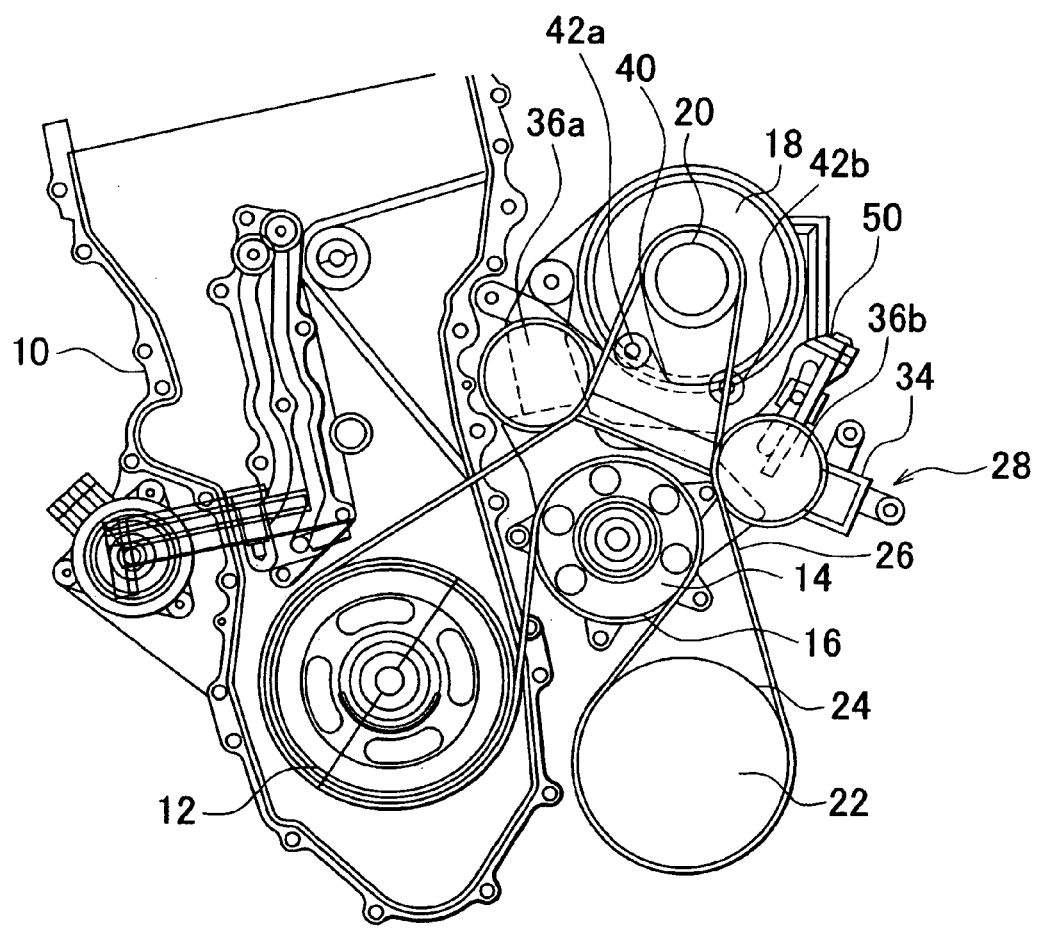
FIG. 1 shows the configuration of an embodiment of the invention.

FIG. 1 shows an area around structural elements like an engine block and a motor generator to which a tensioner according to the invention is attached.

Figure 3:
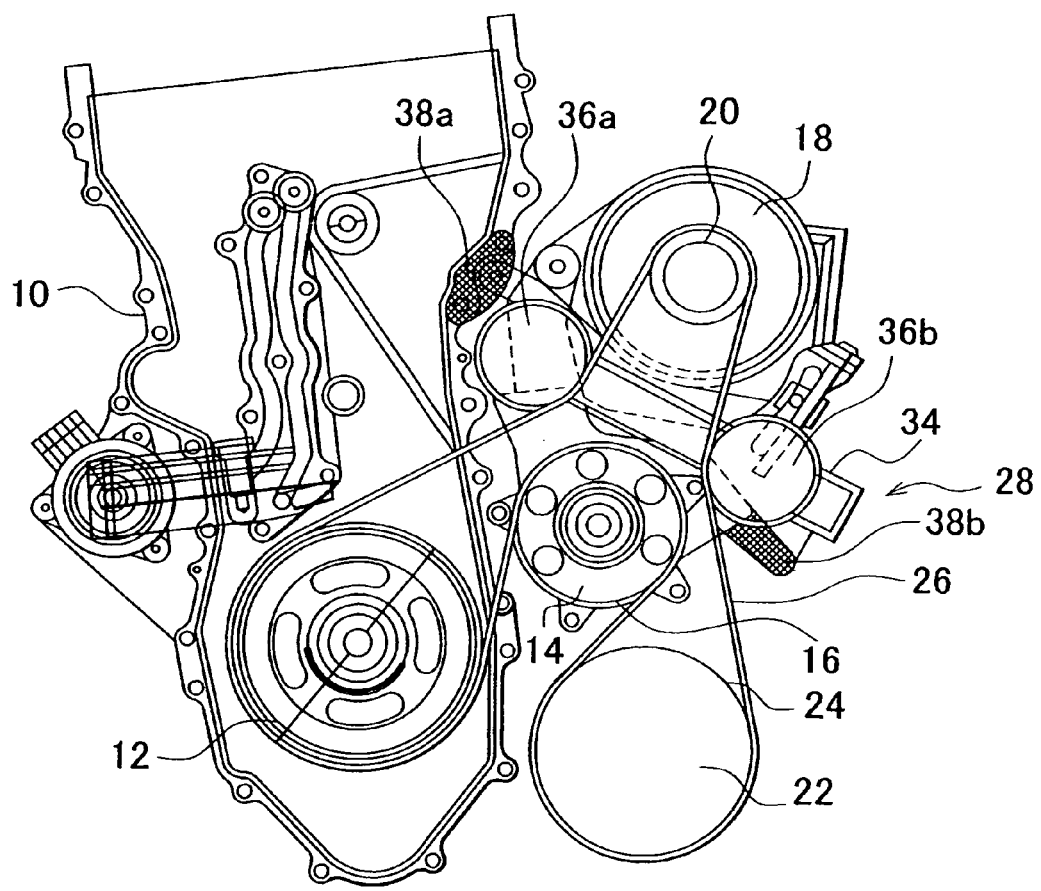
FIG. 3 shows a known motor generator mounting structure.

The structure shown in FIG. 1, like the known example of FIG. 3, includes an engine block 10, a water pump 14, a motor generator 18, and an air conditioner compressor 22, as well as respective pulleys 12, 16, 20 and 24 which are attached thereto. A belt 26 is wound around the pulleys 12, 16, 20 and 24. Accordingly, driving force of the pulley 12 is utilized to drive the water pump 14, the motor generator 18, and the compressor 22.

A tensioner 28 for the belt 26 is provided in the vicinity of the motor generator 18, and applies tensioning force (tension) in a similar manner to the previously described known art.

Figure 2:
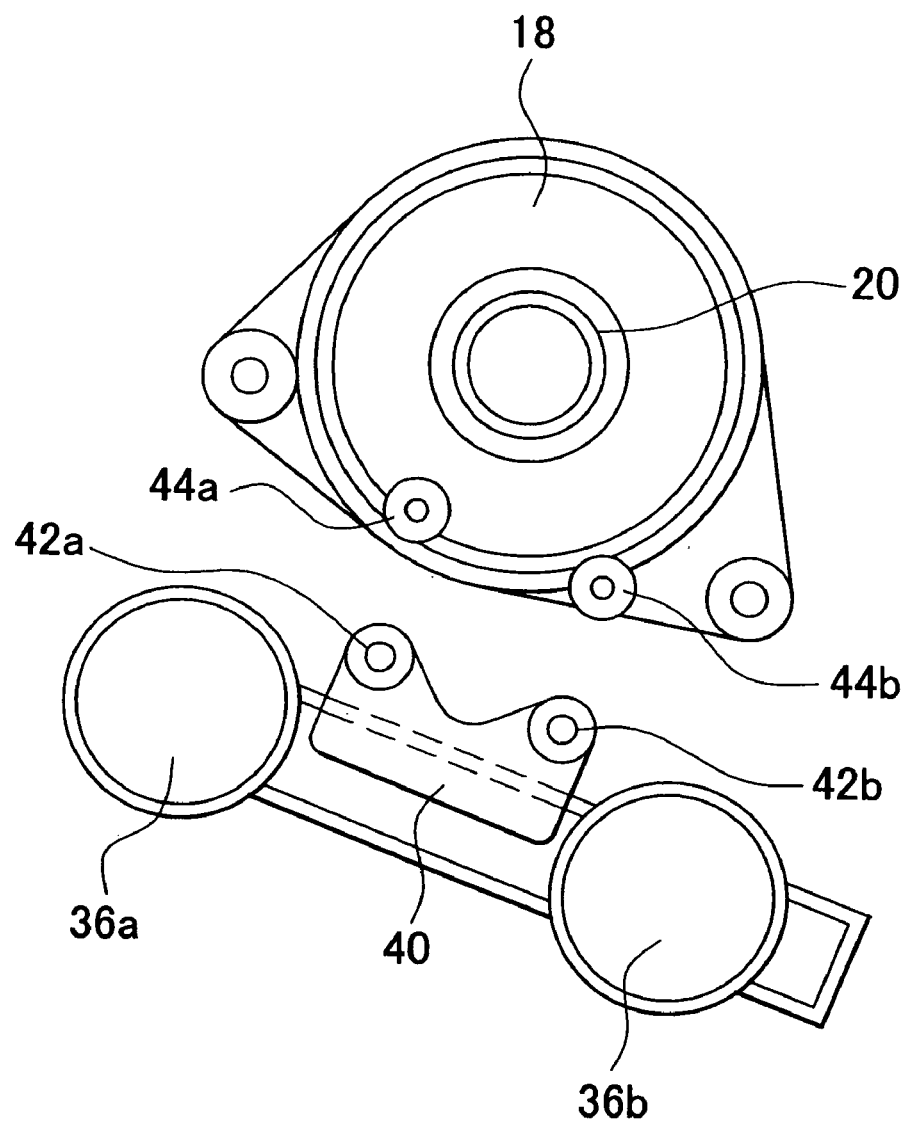
FIG. 2 illustrates the attachment structure of a motor generator and a tensioner.

Further, as shown in FIG. 2, the tensioner 28 includes a main body 34, and a pair of rollers 36a and 36b. An attachment 40 is provided in a central portion of the main body 34 between the rollers 36a and 36b, and a base portion of the attachment 40 is welded to the base 34. A pair of bolt holes 42a and 42b are provided in a protruding portion of the attachment 40 that protrudes from the main body 34. It should be noted that the attachment 40 may be fixed to the main body 34 by methods other than welding, such as by bolting.

The motor generator 18 is provided with a pair of bosses 44a and 44b, which are positioned so as to correspond with the bolt holes 42a and 42b. Accordingly, as shown in FIG. 1, the tensioner 28 is fixed to the motor generator 18 by aligning and bolting together the bosses 44a and 44b and the bolt holes 42a and 42b.

Further, one side of the motor generator 18 is fixed to the engine block 10, and the other side is movably attached by a fixing portion 50 to an attachment point which would be used, in the case of the known art, to attach an alternator. The fixing portion 50 includes a long hole and a bolting mechanism for bolting a bolt in the long hole. The fixing portion 50 allows the entire motor generator 18 to be attached to the engine block 10 such that an attachment angle of the motor generator 18 can be changed centering on an axis point at the engine block 10 edge side. Note that, it is possible to adjust the tension of the belt 26 by adjusting the attachment position of the motor generator 18 in the fixing portion 50.

Accordingly, in this embodiment, the tensioner 28 is fixed to the motor generator 18 rather than the engine block 10, and there is no need to provide a bracket for attachment to the engine block 10. As a result, the embodiment can be easily applied to different engines with different boss positions or no suitable bosses since the tensioner 28 is fixed to the motor generator 18. Accordingly, the previously discussed attachment related problems of the known art are not encountered. The embodiment thus offers outstanding versatility, and provides an efficient structure that eliminates the need to modify unnecessary components, or the like, since the tensioner 28 is fixed to the motor generator 18.

In addition, it is preferable if the tensioner 28 is fixed to the motor generator 18 first, and then both elements are attached to the engine block 10 as a single component. Accordingly, if the tensioner 28 is fixed to the motor generator 18 in advance, when these elements are attached to the engine block 10, the operation can be performed with great ease in the same way as when just the motor generator 18 is attached. Furthermore, if the motor generator 18 and the tensioner 28 are attached separately, it is necessary to provide a degree of installation space to prevent interference of the motor generator 18 and the tensioner 28 from occurring. Accordingly, enough space to satisfy this requirement must be left. However, if the tensioner 28 and the motor generator 18 are fixed together to start with, the installation space that must be left is only that required for attachment of a single integrated component. As a result, it is possible to reduce the amount of installation space that must be left by a corresponding extent.

It should be noted that if the winding angle of the belt 26 with respect to the pulley 20 of the motor generator 18 becomes less than 180 degrees, there is a possibility that the belt 26 will slip on the pulley 20. However, according to this embodiment, the position of the tensioner 28 etc. with respect to the pulley 20 can be determined in advance, thus making it easy to set the winding angle of the belt 26 at 180 degrees or more.

In addition, if multiple bosses for attachment of the tensioner 28 are provided at predetermined distances apart around the entire circumference of the motor generator 18, it is possible to attach the tensioner 28 from various different directions. Accordingly, it is possible to improve attachment flexibility.

While the invention has been described with reference to preferred embodiments thereof, it is to be understood that the invention is not limited to the preferred embodiments or constructions. To the contrary, the invention is intended to cover various modifications and equivalent arrangements other than described above. In addition, while the various elements of the preferred embodiments are shown in various combinations and configurations, which are exemplary, other combinations and configurations, including more, less or only a single element, are also within the spirit and scope of the invention.

What is claimed is:

1. A motor generator mounting structure for an internal combustion engine comprising:
   an engine body including an output shaft and an output portion connected to the output shaft;
   a motor generator which is attached to the engine body and which includes a drive shaft and an output-input portion connected to the drive shaft;
   a loop-shaped connecting body that links the output portion of the engine body and the output-input portion of the motor generator;
   a tensioner which controls tension of the loop-shaped connecting body and which is fixed to the motor generator; and
   a plurality of bosses formed on a surface of and around a periphery of the surface of the motor generator, wherein the tensioner is fixed by bolting to the plurality of bosses.

2. The motor generator mounting structure according to claim 1, wherein
   the loop-shaped connecting body is a belt, the output portion of the engine body is a pulley, the output-input portion of the motor generator is a pulley, and the tensioner is fixed to a casing of the motor generator.

3. The motor generator mounting structure according to claim 1, wherein
   the tensioner includes a pair of rollers, and the tension of the loop-shaped connecting body is controlled using the rollers.

* * * * *